United States Patent [19]
Gamble et al.

[11] Patent Number: 5,992,799
[45] Date of Patent: Nov. 30, 1999

[54] EARTH BASED SPACECRAFT ORBIT AND ATTITUDE CONTROL USING A LOOK-AHEAD THRUSTER SELECTION LOGIC AND MAGNETIC TORQUERS

[75] Inventors: Donald W. Gamble, Menlo Park; Mark D. McLaren, Redwood City; Marc Takahashi, Menlo Park, all of Calif.

[73] Assignee: Space Systems/Loral, Inc., Palo Alto, Calif.

[21] Appl. No.: 08/801,842

[22] Filed: Feb. 18, 1997

Related U.S. Application Data
[60] Provisional application No. 60/013,038, Mar. 8, 1996.

[51] Int. Cl.⁶ .................................................. B64G 1/24
[52] U.S. Cl. .......................... 244/164; 244/165; 244/169; 244/171; 244/158 R
[58] Field of Search .................................... 244/164, 165, 244/169, 171, 158 R

[56] References Cited

U.S. PATENT DOCUMENTS

| | | | |
|---|---|---|---|
| 3,114,517 | 12/1963 | Brown | 244/164 |
| 3,586,261 | 6/1971 | Paine | 244/164 |
| 4,288,051 | 9/1981 | Goschel | 244/171 |
| 5,248,118 | 9/1993 | Cohen et al. | 244/164 |
| 5,803,407 | 9/1998 | Scott | 244/164 |
| 5,862,495 | 1/1999 | Small et al. | 244/165 |

FOREIGN PATENT DOCUMENTS

| | | |
|---|---|---|
| 0071445 A2 | 2/1983 | European Pat. Off. |
| 0260957 A2 | 3/1988 | European Pat. Off. |
| 0453096 A1 | 10/1991 | European Pat. Off. |
| 0460935 A2 | 12/1991 | European Pat. Off. |

OTHER PUBLICATIONS

Journal of Guidance, Control and Dynamics, vol. 18, No. 2, Mar./Apr. 1995, Wash. D.C., pp. 256–263, XPO00531533, H. Krishnan et al., "Attitude Stabilization of a Rigid Spacecraft Using Two Momentum Wheel Actuators".

*Primary Examiner*—J. Woodrow Eldred
*Attorney, Agent, or Firm*—Perman & Green, LLP

[57] ABSTRACT

A spacecraft ground loop controller (GLC), located on the Earth, interfaces with a satellite ground station receiving spacecraft telemetry from the downlink baseband equipment and automatically sending spacecraft commands through the command uplink baseband equipment to control the attitude of an orbiting spacecraft and achieve partial orbit control using commanded thruster firings and magnetic torquer polarity and magnitude. A cooperative approach of using all available thrusters, of both the primary and redundant strings, provides greater fuel savings.

22 Claims, 3 Drawing Sheets

EARTH BASED SPACECRAFT ORBIT AND ATTITUDE CONTROL USING A LOOK-AHEAD THRUSTER SELECTION LOGIC AND MAGNETIC TORQUERS

CLAIM TO PRIORITY BASED ON CO-PENDING PROVISIONAL APPLICATION

The present application is related to co-pending Provisional patent application Ser. No. 60/013,038 of Donald W. Gamble, Mark McLaren, and Marc Takahashi, filed Mar. 8, 1996, entitled "EARTH BASED SPACECRAFT ORBIT AND ATTITUDE CONTROL USING A LOOK-AHEAD THRUSTER SELECTION LOGIC AND MAGNETIC TORQUERS", and based on which priority is herewith claimed under 35 U.S.C. 119(e) and the disclosure of which is incorporated herein by reference in its entirety.

BACKGROUND OF THE INVENTION

1. Field of the Invention

The present invention relates to Earth-orbiting spacecraft or satellite control systems and more particularly to a ground-based control system which interfaces with a satellite's ground station to automatically continue attitude control of a spacecraft in the event of the failure of the momentum wheel or reaction wheel system.

2. Prior Art Problem to be Solved

Various systems are known for the control of Earth-orbiting spacecraft or satellites involving the use of hardware and software for executing complex control algorithms that utilize on-board attitude control equipment such as momentum wheels, gyros, magnetic torquers, and thrusters to maintain and alter the satellite's orientation and orbit. However, problems are posed with such systems when there are failures in the proper operation of an on-board control device. In such event, the equipment and algorithms must be quickly adjusted to deal with the changed situation and maintain the satellite in its desired attitude and orbit. As the on-board control equipment and fuel are self-contained, the required adjustments should be efficient in execution.

One example of a system of this type is the ground loop automatic control system (GLACS) of Telestar of Canada. Pertinent features of the GLACS syst em involve using a combination of on-board roll/pitch sensing and ground-based yaw sensing, and ground-commanded magnetic torquer actuations/thruster firings to perform day-to-day attitude control. In Yaw sensing the incoming signal is aligned 45° to the nominal polarization and t he detector uses two probe s positioned 90° apart to sense two components that are amplified by the system separately, and which components are then compared to produce the Yaw signal. Two basic modes of operation a re provided, namely: normal mode, for day-to-day operations, and acquisition mode, to deal with higher rate situations (post stationkeeping or attitude re-acquisition). The features of these modes are listed in the following Tables I and II.

TABLE I

Normal Mode

| | POSITION | RATE | ACTUATOR | |
|---|---|---|---|---|
| Yaw | APK & EDM RF yaw sensors | Derived from position | Roll torquer coil with thruster backup | |
| Roll | ESA/ASP 32 sample roll error telemetry | Derived from position | Yaw torquer coil with thruster backup | |
| Pitch | ESA/ASP 2 sample pitch error telemetry | Derived from position | Subset of thrusters, 6, 8N, 8S, 9N, 9S, 11 | |

TABLE II

Acquisition Mode

| | POSITION | RATE | ACTUATOR | |
|---|---|---|---|---|
| Yaw | APK & EDM RF yaw sensors | Derived from integrated yaw RMA angle | North face thrusters, east/west face thruster backup | |
| Roll | ESA/ASP 32 sample roll error telemetry | Derived from integrated RMA roll angle or roll rate | North face thrusters, east/west face thruster backup | |
| Pitch | ESA/ASP 2 sample pitch error telemetry | Derived from position or pitch RMA rate | Subset of thrusters 6, 8N, 8S, 9N, 9S, 11 | |

Also, stationkeeping maneuvers are performed by existing on-board processes.

The GLACS system is made feasible by the availability of small thrusters on the spacecraft with which it has been implemented. Many other spacecraft that use larger thrusters and consequently produce larger torques would make the implementation of the GLACS system thereon significantly less fuel efficient. In addition, the GLACS system uses a means of yaw sensing as described above which in many other spacecraft systems would be readily available or easily available. Thus, the GLACS system has limited usefulness for spacecraft in general.

3. Objects

It is accordingly an object of the present invention to provide a more generally applicable system that enables the continued attitude control and simultaneous partial orbit control of a spacecraft in the event of momentum wheel failure with the novel and efficient use of thrusters, magnetic torquers and on-board gyroscopes.

SUMMARY OF THE INVENTION

The present invention involves a spacecraft controller system having a ground loop controller (GLC) that is physically located on the Earth and interfaces with a satellite ground station receiving spacecraft telemetry from downlink baseband equipment and returning commands through command uplink baseband equipment. This controller system automatically sends spacecraft commands through the command uplink baseband equipment using the ground loop control (GLC) to control the attitude of an orbiting spacecraft, and achieve partial orbit control, using commanded thruster firings. It enables the continued attitude control of a spacecraft in the event of momentum wheel failure with the novel and efficient use of thrusters, magnetic torquers and on-board gyroscopes. A cooperative approach of using all available thrusters, of both the primary and redundant strings, provides greater fuel savings.

DETAILED DESCRIPTION OF THE PREFERRED EMBODIMENTS

Figure 1:
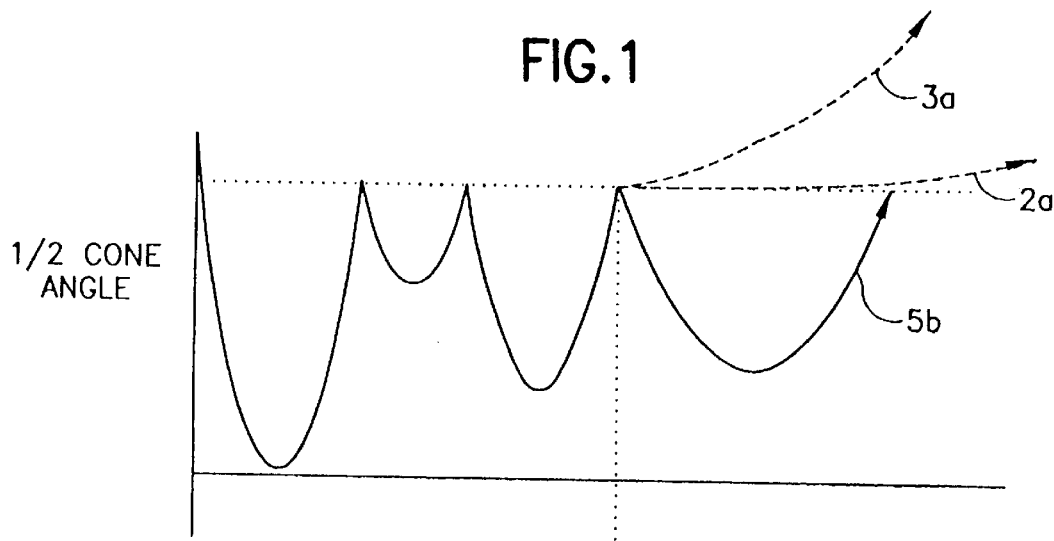
FIG. 1 is a plot of the satellite's ½ cone angle.

The present invention is directed to an automatic controller system using a ground loop control (GLC) for controlling the attitude of an orbiting spacecraft, and which achieves partial orbit control, using commanded thruster firings. The controller system is composed of an Earth-based computer, including satellite control software, that interfaces with a satellite ground station receiving spacecraft telemetry from downlink baseband equipment and returning commands through command uplink baseband equipment. The software includes estimators, controller algorithms, redundancy management routines, and communication routines. The estimators take sensor data as extracted from the telemetry signals or frames and provide output estimates of the spacecraft attitude and rates (including yaw angle, for which no direct measurement is available). They also take data from the thruster torque table and provide thruster torque estimates. The yaw is determined using a gyrocompassing filter (kinetic or dynamic) driven by continuously running gyros. The controller algorithm takes the various estimates and produces thruster firing commands to maintain the spacecraft attitude within a defined pointing region. Other actuation devices, such as magnetic torquers, may also be used in the process, in which event, commands are also sent to control these other actuation devices.

Appropriate control torques are provided by thrusters, and magnetic torquers if available. If the momentum wheels are turned off, one wheel tachometer is reset such that the wheel speed measurement is zero. The other wheel tachometer is not reset, and reads the tachometer underspeed limit. The difference between the two measured wheel speeds allows the magnetic torquers to provide current output (control torque) with the polarity and magnitude being set by user command. Roll thruster torques are provided by manual thruster pulse commands available only in 10 ms quanta of pulse widths. Pitch/yaw thruster torques are provided by differentially setting commanded speed for each wheel, such that cycling through on-orbit wheel control mode will immediately effect a momentum unload pulse. The unload pulse is set by user command and can be less than 10 ms.

To achieve minimum fuel use, the standard roll, pitch, and yaw independent axis control is discarded. The attitude is controlled to a pointing polyhedron parameterized using the region's origin offset (with respect to the nominal antenna boresight), along with a series of (radius, polar angle) pairs. The region defines the −3 dB coverage for the antenna beam pattern, and thus relates directly to communications performance. The definition of the pointing region includes as a subset the more traditional half-cone angle region, where the origin offset is zero and the radius is constant for all polar angles. Accordingly, a convex pattern may be fixed on the ground to define a pointing region and a vector fixed in the spacecraft body coordinates is projected to the ground, whereupon it is determined whether the vector intersects the ground within the interior of the convex pattern to evaluate the pointing performance. The vector and convex ground pattern may be modified during use.

The spacecraft is set up in an automatic on-board thruster control mode which acts as a safety mode if commanding from the GLC should be interrupted. Sensor bias commands are sent periodically to the spacecraft to center the on-board mode deadband to the current attitude. These bias commands also serve as a GLC "heartbeat" that can be detected at the backup site and the absence of which indicates a problem at the primary site.

Thrusters are fired singly or in pairs, as determined by the thruster selection algorithm. This algorithm propagates the dynamic model of the spacecraft attitude, including estimates of external torques, forward in time to find the thruster or thruster pair that results in the least fuel use rate before the spacecraft reaches the edge of the attitude pointing region, with the total thruster fuel use being weighted using the estimated time until next firing. Accordingly, thruster firings may be selected by propagating the spacecraft attitude forward in time for each candidate thruster that may be fired to determine which thruster firing or combination of thruster firings provides minimum fuel use for a predetermined pointing performance.

An orbit model, propagating from the last Orbit Determination result, determines the current orbit resulting from the commanded thruster activity. Since there will be a relatively large number of thruster firings each day, there will be sufficient thruster activity to allow East-West stationkeeping (EWSK), of both eccentricity vector and radial component control, on a continuous basis. That is, the thruster selection algorithm is biased to the selection of the appropriate thruster to accomplish both attitude control and an EW orbital correction in the desired direction. In this way, the need for separate EWSK maneuvers will be greatly reduced or completely disappear, saving overall fuel use. North-South Stationkeeping (NSSK) requires more thruster activity than the GLC will provide, but can still be helped by biasing the thruster selection algorithm in the desired North/South direction depending on the orbit inclination.

The preferred embodiment of the invention may be made up of two fault tolerant computers which independently run the satellite control software. One of the computers is designated primary, and as such is authorized to send spacecraft attitude control commands. The other or secondary computer acts as a hot backup, running the satellite control software in parallel with the primary computer, but not actually sending commands. If the primary computer fails for any reason, logic in the secondary computer, or in an independent monitor unit, will transfer commanding authority immediately and automatically to the secondary computer.

The primary computer constantly sends commands to the spacecraft. Even if it is not required to send attitude control commands, the primary computer will send the periodic heartbeat commands which can be detected in telemetry signals and will imply the state of health of the command link. The backup computer can detect the heartbeat commands, and can infer failure of the primary computer if the heartbeat command disappears. Each computer also monitors an active status line in the other computer to detect computer failure.

The GLC system of the invention may be situated between the system operator computer and the baseband command transmitter so as to intercept all operator generated spacecraft commands. If the GLC controller is sending a Command sequence, it will delay any non time-critical operator generated command for the duration of that sequence. The GLC computers communicate with the operator computers to receive parameter updates and send logger, warning, or alarm messages.

The GLC computers control switches in the baseband telemetry and command strings to switch to backup baseband equipment strings if a failure is detected in any baseband equipment unit. In this way, even though individual system components can fail, system redundancy is achieved and the GLC has a very high system availability.

If a backup ground station is available, a backup GLC unit can be located there and can monitor the primary site using a combination of the telemetered command carrier receiver signal strength and the telemetered command execute history of the heartbeat commands.

Following are features of the invention relating to CONTROL LAW, FUEL OPTIMAL THRUSTER SELECTION, YAW ESTIMATOR, ORBIT ESTIMATION AND CONTROL, and EAST/WEST $\Delta V$ SCHEDULE, as will now be outlined and explained.

CONTROL LAW

Two methods of choosing thruster commands,
Fuel optimal
  Generates a list of feasible single/double fire commands,
  Chooses best command based on fuel efficiency and meeting the Delta V schedule generated by orbit control,
  Can use a non-circular pointing region,
Backup
  Only used if there is no Fuel Optimal solution,
  Generates a list of single/double/triple fire commands based on rate/attitude switching curves,
  Chooses command closest to meeting Delta V schedule,
Bang-Bang roll and yaw magnetic torquer commands based on rate/attitude switching curve.

Figure 4:
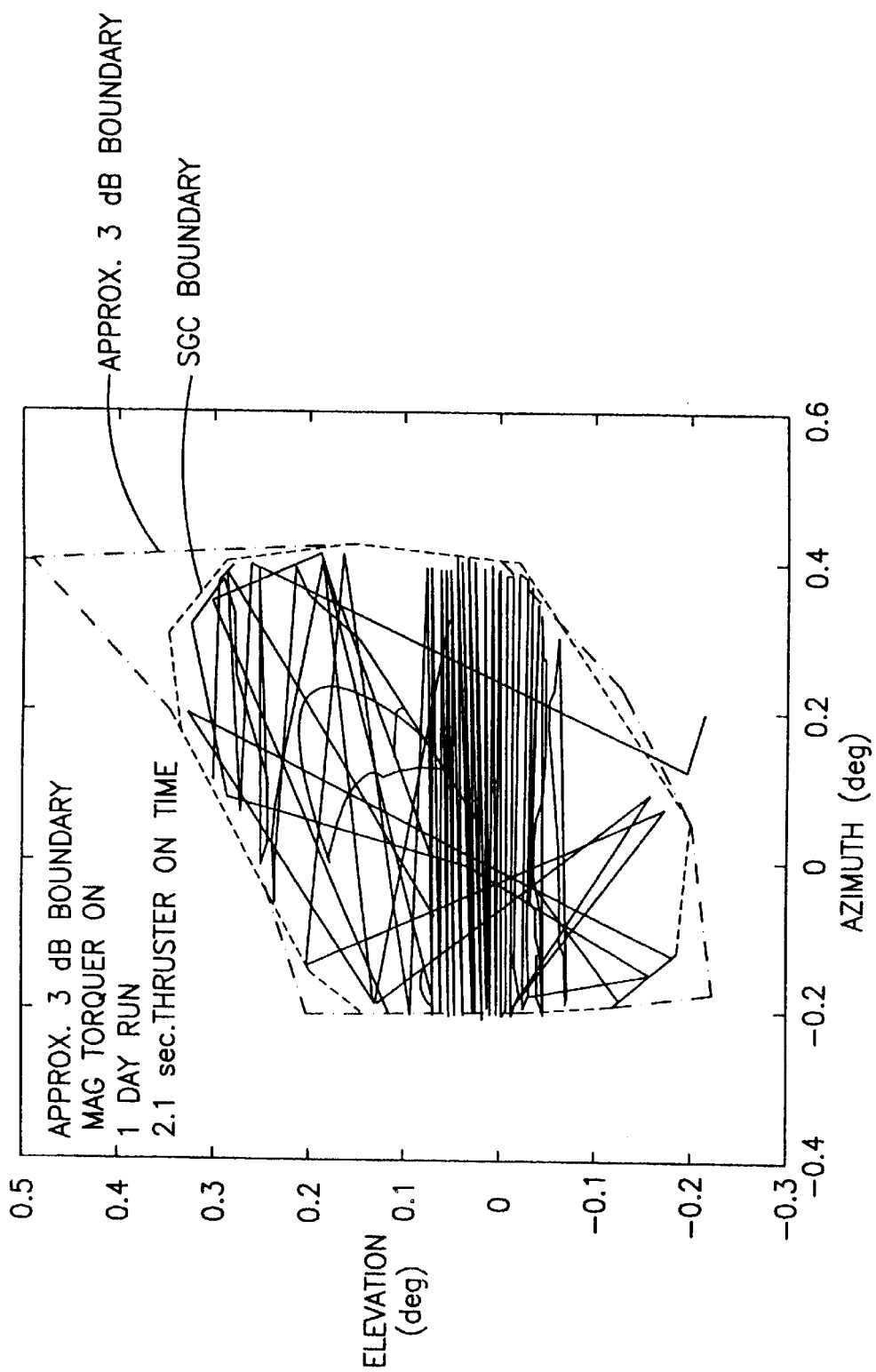
FIG. 4 is an illustrative plot of Elevation (deg) versus Azimuth (deg) for a non-circular pointing region.

Accordingly, there are two methods of choosing thruster commands, i.e., fuel optimal and backup. The fuel optimal approach involves the steps of generating a list of feasible single/double fire commands and choosing the best command based on fuel efficiency and meeting the $\Delta V$ schedule generated by orbit control. A non-circular pointing region can be used. An illustrative plot of Elevation (deg) versus Azimuth (deg) for a non-circular pointing region is shown in FIG. 4.

The backup approach is only used if there is no fuel optimal solution and involves generating a list of single/double/triple fire commands based on rate/attitude switching curves, and choosing the command closest to meeting the $\Delta V$ schedule. And, Bang-Bang roll and yaw magnetic torquer commands are based on the rate/attitude switching curve. Thus, the magnetic torquer command selection is determined as a function of the estimated attitude of the spacecraft.

FUEL OPTIMAL THRUSTER SELECTION

Figure 2:
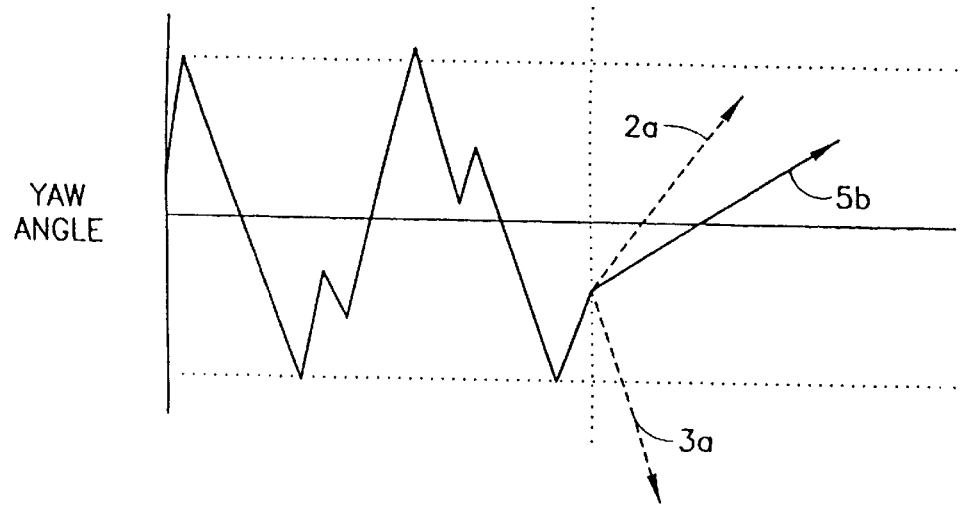
FIG. 2 is a plot of the satellite's yaw angle.

Generates a list of feasible thruster commands
i.e., brings ½ cone angle and yaw attitude in bounds
Rank solutions by ratio of time in bounds and fuel use
Choose solution that best meets Delta V schedule from orbit control Accordingly, a list of feasible thruster commands are generated, i.e., the ½ cone angle and yaw attitude is brought in bounds. Solutions are ranked by ratio of time in bounds and fuel use. The solution that best meets the $\Delta V$ schedule from orbit control is chosen. Illustrative ½ cone angle and yaw angle plots are shown in FIGS. 1 and 2.

YAW ESTIMATOR

Yaw estimation is required since there is no yaw sensor,
Ground-based gyrocompassing yaw estimator may be implemented such as for N-Star program, Yaw Attitude Determination Algorithm
  4th order Kalman filter uses DSS, roll ES, and roll/yaw DIRA,
  4th order Kalman filter uses roll ES and roll/yaw DIRA,
  Transitions between the two filters depending on Sun presence.

Accordingly, Yaw estimation is required in the absence of a yaw sensor. A ground-based gyrocompassing yaw estimator may be used. The yaw attitude determination algorithm involves a 4th order Kalman filter using DSS, roll ES, and roll/yaw DIRA, and a 4th order Kalman filter using roll ES and roll/yaw DIRA. Transitions between the two filters are determined depending on the presence of the Sun.

ORBIT ESTIMATION AND CONTROL

Propagate an internal orbit model based on last orbit determination and thruster commands issued by the Control Law;
Use the daily averages of the internal orbit state to assess how Delta V should be directed for the next day;
Schedule desired Delta V accumulations for the control law to meet;
Can set orbit control to orbit neutral if no Delta V accumulation is desired.

Accordingly, an internal orbit model, based on the last orbit determination and thruster commands issued by the control law, is propagated. Using the daily averages of the internal orbit state, it is assessed as to how $\Delta V$ should be directed for the next day. Desired $\Delta V$ accumulations are scheduled for the control law to meet. Orbit control can be set to orbit neutral if no $\Delta V$ accumulation is desired.

EAST/WEST $\Delta V$ SCHEDULE

Figure 3:
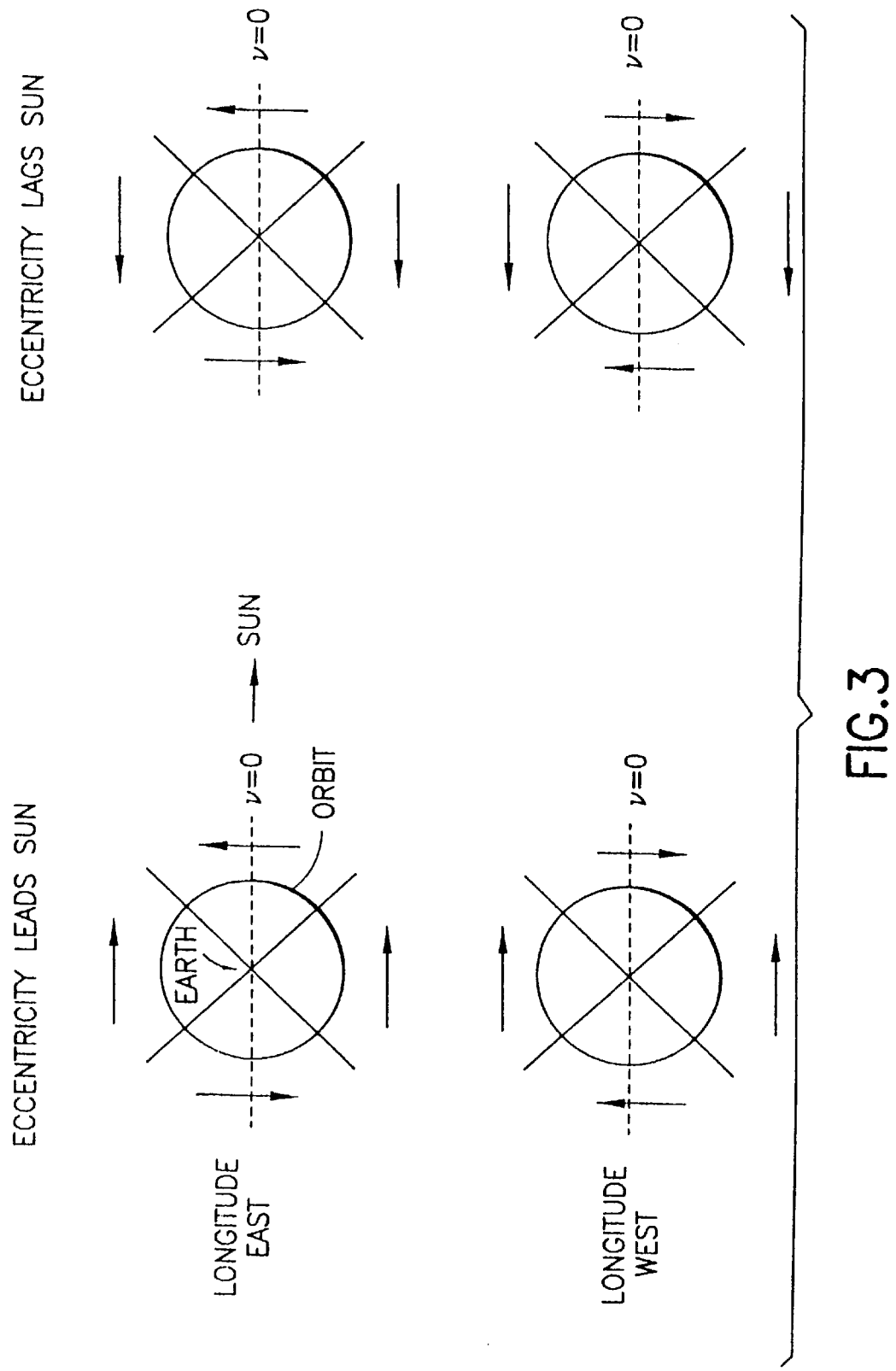
FIG. 3 illustrates a set of earth-centered orbits with thruster vectors and the Sun orientation to the right.

FIG. 3 illustrates a set of earth-centered orbits along with thruster vectors and the Sun orientation to the right. The thruster vectors are used to correct the satellite's eccentricity with respect to the Sun as shown.

It will be seen from the foregoing description that a ground loop automatic control system is disclosed that provide s an efficient and novel thruster selection and control logic and simultaneous east-west orbit and spacecraft attitude control. Additionally, yaw estimates are obtained more simply and more accurately.

What is claimed is:

1. An Earth-based spacecraft ground loop controller (GLC) for controlling an Earth-orbiting satellite's on-board attitude control equipment, including momentum wheels, momentum wheel tachometers, gyros, magnetic torquers, and thrusters, in combination with a satellite ground station receiving spacecraft sensor data telemetry signals from the downlink baseband equipment and sending spacecraft commands through the command uplink baseband equipment, to maintain and alter the satellite's orientation and orbit, comprising:

means for interfacing with said satellite ground station to receive spacecraft telemetry data from the downlink baseband equipment and to send spacecraft commands through the command uplink baseband equipment; and means, coupled to said interfacing means and responsive to telemetry data from an orbiting spacecraft indicating momentum wheel failure, for automatically sending spacecraft commands through the command uplink baseband equipment to control the attitude of said orbiting spacecraft and achieve partial orbit control using commanded thruster firings and magnetic torquer polarity and magnitude.

2. A controller as in claim 1 wherein said means for automatically sending spacecraft commands comprises:
   a computer running satellite control software, and
   wherein said software comprises:
      means for providing estimators;
      means for providing controller algorithms;
      means for providing redundancy management routines; and
      means for providing communication routines.

3. A controller as in claim 2 wherein said estimators comprise:
   means for extracting sensor data from the telemetry data; and
   means for using said sensor data to provide output estimates of the spacecraft attitude and rates and yaw angle.

4. A controller as in claim 1 further comprising:
   means, in said spacecraft responsive to said commands when the momentum wheels are turned off, for resetting a first wheel tachometer such that the wheel speed measurement is zero;
   means, in said spacecraft responsive to said commands, for using a second wheel tachometer to read the tachometer underspeed limit measurement; and
   means, in said spacecraft, for using the difference between the first and second tachometer measurements to cause the magnetic torquers to provide current output to control torque and for setting the polarity and magnitude in response to said commands.

5. A controller as in claim 1 further comprising:
   means, in said spacecraft responsive to said commands, for providing roll thruster torques by manual thruster pulse commands in 10 ms quanta of pulse widths.

6. A controller as in claim 1 further comprising:
   means, in said spacecraft responsive to said commands, for providing pitch/yaw thruster torques by differentially setting a commanded speed for each wheel, such that cycling through on-orbit wheel control mode will immediately effect a momentum unload pulse; and
   means, in said spacecraft responsive to said commands, for setting the momentum unload pulse.

7. A controller as in claim 6 further comprising:
   means for setting the momentum unload pulse by user command.

8. A controller as in claim 1 further comprising:
   means for discarding the standard roll, pitch, and yaw independent axis control; and
   means for selecting thruster firing by propagating the spacecraft attitude forward in time for each candidate thruster to be fired, whereby fuel use is minimized or pointing performance is improved.

9. A controller as in claim 1 further comprising:
   means for setting the current of a magnetic torquer of the spacecraft to select the commanded magnetic torquer polarity and magnitude; and
   means for determining the magnetic torquer command selection as a function of the estimated attitude of the spacecraft.

10. A method for controlling an Earth-orbiting satellite's on-board attitude control equipment, including momentum wheels, momentum wheel tachometers, gyros, magnetic torquers, and thrusters, in combination with a satellite ground station receiving spacecraft sensor data telemetry signals from the downlink baseband equipment and sending spacecraft commands through the command uplink baseband equipment, to maintain and alter the satellite's orientation and orbit, comprising the steps of:
    interfacing with said satellite ground station to receive spacecraft-momentum-indicative telemetry data from the downlink baseband equipment and to send spacecraft commands through the command uplink baseband equipment; and
    in response to receiving spacecraft-momentum-indicative telemetry data from an orbiting spacecraft indicating momentum wheel failure, automatically sending spacecraft commands through the command uplink baseband equipment to control the attitude of said orbiting spacecraft and achieve partial orbit control using commanded thruster firings and magnetic torquer polarity and magnitude.

11. The method as in claim 10 wherein said step of automatically sending spacecraft commands comprises:
    providing a computer running satellite control software, and providing said software with estimators, controller algorithms, redundancy management routines, and communication routines.

12. The method as in claim 11 wherein said estimators operate to take sensor data, as extracted from the telemetry data, and provide output estimates of the spacecraft attitude and rates and yaw angle.

13. The method as in claim 12 wherein said estimators' step of providing yaw angle output estimates comprises:
    taking data, as extracted from the telemetry data, and applying a gyrocompassing filter thereto driven by continuously running gyros.

14. The method as in claim 12 wherein said estimators further operate to take data from the thruster torque table and provide thruster torque estimates.

15. The method as in claim 14 wherein said step of providing controller algorithms comprises:
    taking said estimates of the spacecraft attitude and rates and yaw angle and thruster torque and producing thruster firing commands to maintain the spacecraft attitude within a defined pointing region.

16. The method as in claim 15 wherein said step of providing controller algorithms further comprises:
    taking said estimates of the spacecraft attitude and rates and yaw angle and thruster torque and producing torquer commands to actuate and control said magnetic torquers to maintain the spacecraft attitude within a defined pointing region.

17. The method as in claim 10 further comprising the step of:
    selecting thruster firings by propagating the dynamic model of the spacecraft attitude forward in time for each candidate thruster that may be fired to determine which thruster firing or combination of thruster firings provides minimum fuel use for a predetermined pointing performance.

18. The method as in claim 10 wherein said commanded thruster firings comprise the step of:
    selecting said thruster firings by propagating the spacecraft attitude forward in time for each candidate thruster to be fired, whereby fuel use is minimized or pointing performance is improved.

19. The method as in claim 10 wherein said commanded magnetic torquer polarity and magnitude are selected by setting the current of a magnetic torquer of the spacecraft, and further comprising the step of:

determining the magnetic torquer command selection as a function of the estimated attitude of the spacecraft.

20. The method as in claim 10 further comprising providing a measure of the attitude pointing performance by the steps of:

fixing a convex pattern on the ground to define a pointing region;

projecting a vector fixed in the spacecraft body coordinates to the ground; and determining if said vector intersects the ground within the interior of said convex pattern defining the pointing region.

21. The method as in claim 10 further comprising, when the momentum wheels are turned off, the steps of:

resetting one wheel tachometer such that the wheel speed measurement is zero;

using the other wheel tachometer to read the tachometer underspeed limit;

using the difference between the two measured wheel speeds to cause the magnetic torquers to provide current output (control torque) while setting the polarity and magnitude by user command;

providing roll thruster torques by manual thruster pulse commands in 10 ms quanta of pulse widths;

providing pitch/yaw thruster torques by differentially setting a commanded speed for each wheel, such that cycling through on-orbit wheel control mode will immediately effect a momentum unload pulse; and setting the momentum unload pulse by user command.

22. The method as in claim 10 comprising the further step of discarding the standard roll, pitch, and yaw independent axis control to achieve minimum fuel use.

* * * * *